US005553718A

United States Patent [19]
Robar

[11] Patent Number: 5,553,718
[45] Date of Patent: Sep. 10, 1996

[54] WALL MOUNT FOR AUTOMOTIVE BICYCLE RACK

[76] Inventor: Peter E. Robar, 121 Sanford St., East Longmeadow, Mass. 01028

[21] Appl. No.: 342,886

[22] Filed: Nov. 21, 1994

[51] Int. Cl.⁶ ..................................................... A47F 7/00
[52] U.S. Cl. ............................................. 211/18; 224/924
[58] Field of Search ................................ 211/18, 87, 103, 211/94; 224/924

[56] References Cited

U.S. PATENT DOCUMENTS

| | | | |
|---|---|---|---|
| 3,698,565 | 10/1972 | Weber | 211/87 |
| 3,901,421 | 8/1975 | Kalicki et al. | 211/17 |
| 4,116,341 | 9/1978 | Hebda | 211/17 |
| 4,997,116 | 3/1991 | Grim | 211/18 |
| 5,412,912 | 5/1995 | Alves | 211/94.5 |

*Primary Examiner*—Leslie A. Braun
*Assistant Examiner*—Willie W. Berry, Jr.
*Attorney, Agent, or Firm*—Chapin, Neal & Dempsey, P.C.

[57] ABSTRACT

A wall mount is provided which supports an automotive bicycle rack of the type having a plurality of feet which engage the rear portion of an automobile and straps with hooks for releasably securing the rack to the automobile. The wall mount is a ladder-like device which comprises a pair of vertically disposed rails for fastening to a wall and a plurality of horizontal cross-beam members disposed in vertically spaced orientation on the rails. An uppermost cross-beam member has an upwardly opening "J" cross section and the lowermost cross-beam member having a downwardly opening "J" cross-section, for receiving the hooks of the rack. A pair of intermediate cross-beam members are spaced between the uppermost and lowermost cross-beam members and have vertical surfaces for receiving the feet of the rack. The vertical surface of the lower of said intermediate cross-beam members is disposed approximately 3 to 4 inches further from the wall than said other vertical surface to mimic the bumper of an automobile.

10 Claims, 3 Drawing Sheets

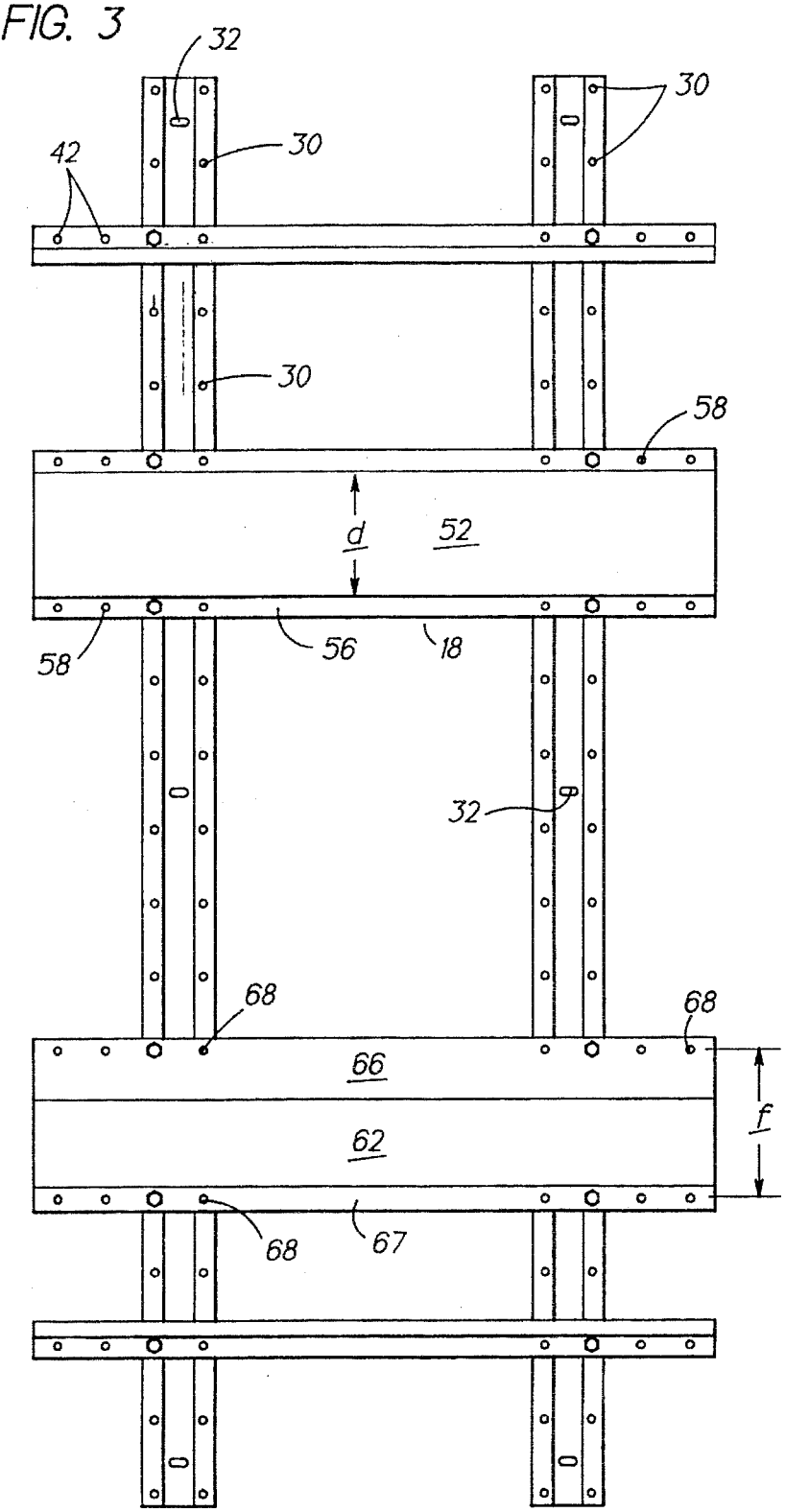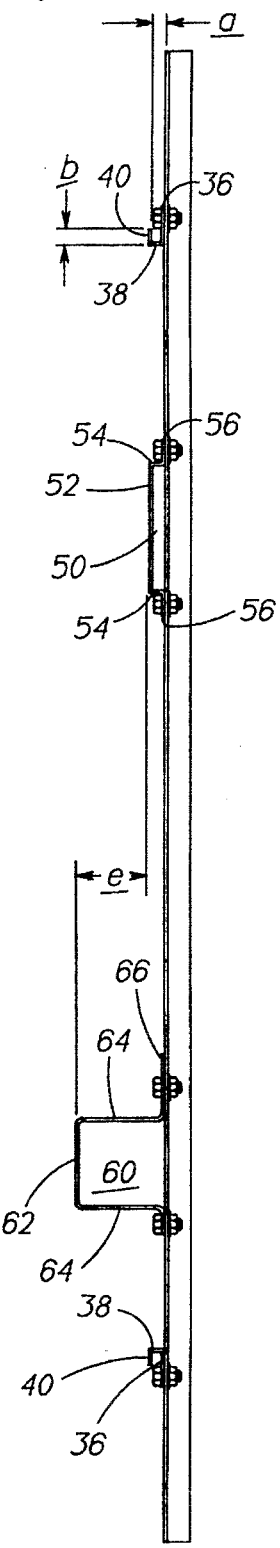

5,553,718

WALL MOUNT FOR AUTOMOTIVE BICYCLE RACK

FIELD OF THE INVENTION

This invention relates to automotive bicycle racks and more particularly to a device for supporting such a rack on a vertical surface for storage of both the rack and a bicycle disposed thereon.

BACKGROUND OF THE INVENTION

The sport of bicycling has become increasingly popular in recent years. Much of the growth in popularity has been attributed to specialized bikes which have been optimized for a specific terrain, namely light weight road racing bikes and off road or "mountain" bikes. In fact, many riders now own more than one bicycle, namely one for road use and another for off-road use. These specialized bikes are generally transported by automobile to locations having the optimal terrain. For example, riders will transport their road bikes to the starting point of a race course or to meet other riders at the start of a group ride. Riders will transport their mountain bikes to a National Forest or other appropriate site for off road riding.

Today's relatively small cars have made it difficult if not impossible to carry one, much less two or more, bicycles inside the vehicle. Accordingly, today many types of bicycle racks or carriers are available which are designed to enable riders to transport their bikes secured on the outside of their cars. Examples of such bike racks are those available from Thule (R), Yakima (R), Allen and Rhode Gear. These racks are available in different styles, some of which mount to the roof of an automobile, while others strap to the rear of the vehicle generally resting on or immediately above the rear bumper. The latter style offers the advantages of being generally lighter in weight and easier to install and remove from the vehicle than the former. A disadvantage of both types of racks, however, is that they tend to be bulky and cumbersome to store when not in use. Although the racks may be collapsed or disassembled for storage, such procedures are generally time consuming and require reassembly prior to subsequent use. As a result, bike owners will seldom disassemble or collapse their racks for storage, thereby requiring a relatively large amount of storage space. This storage problem is exacerbated by the fact that bicycles themselves are quite bulky and require a relatively large amount of storage space when not in use, space which may be at a premium, particularly for apartment or condominium dwellers.

DISCLOSURE OF THE INVENTION

It is a principal object of this invention to provide a device for optimizing storage space available for bicycles and bicycling equipment.

It is an additional object of this invention to provide a device for increasing the utility of an automotive bicycle rack.

It is an additional object of this invention to provide a wall mount capable of securing an automotive bicycle rack thereto for suspending a bicycle along a wall.

A further object of this invention is to provide a wall mounted rack which facilitates quick connection and disconnection of an automotive bicycle rack thereto.

Another object of this invention is to provide a device which facilitates use of an automotive bicycle rack as a home bicycle storage device.

According to this invention, a wall mount for an automotive bicycle rack includes a plurality of rails for fastening to a generally vertical surface such as a wall, in generally coplanar orientation to one another. A plurality of crossbeams or rung members are horizontally disposed onto the rails in vertically spaced relation and include means for releasably engaging hooks of the rack for securing the rack in place on the mount and also include means for engaging feet of the rack.

The above and other objects and advantages of this invention will be more readily apparent from a reading of the following description of an exemplary embodiment thereof taken in conjunction with the following drawing.

BRIEF DESCRIPTION OF THE DRAWINGS

FIG. 3 is a plan view of the wall mount of FIG. 1; and

FIG. 4 is a side view of the wall mount of FIG. 3.

DETAILED DESCRIPTION OF THE PREFERRED EMBODIMENT

As shown in the FIGS., the wall mounted rack for a bicycle rack of the present invention is a ladder-like structure comprising a pair of rails or uprights 12 and several horizontal cross-beams or rung members including upper and lower J-channels 14 and 16 respectively, an upper cross bar 18 and a lower bumper 20.

Figure 1:
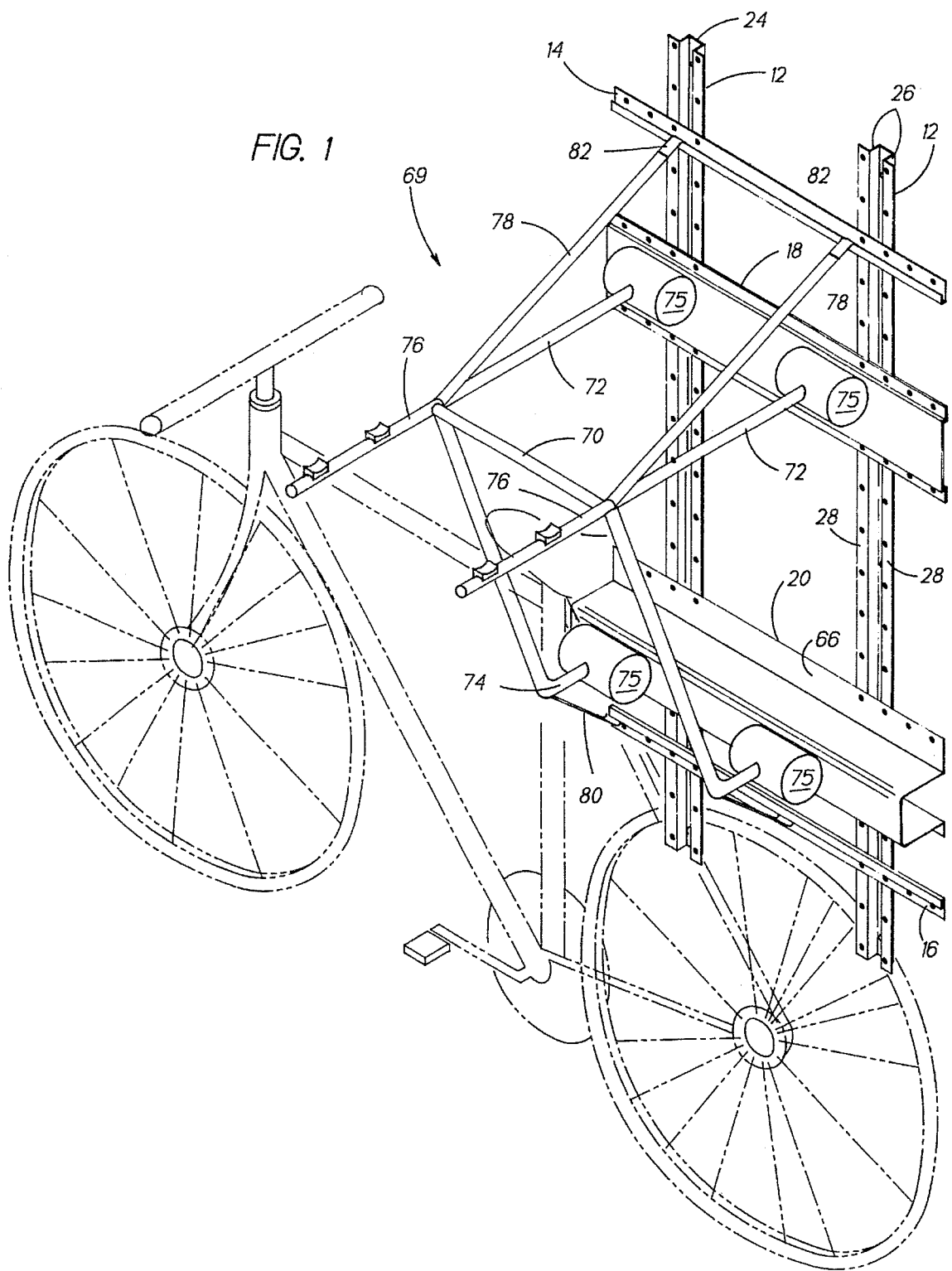
FIG. 1 is a perspective view of a wall mount for an automotive bicycle rack of the type embodying the present invention, with a bicycle rack and a bicycle shown in phantom disposed thereon.
Figure 2:
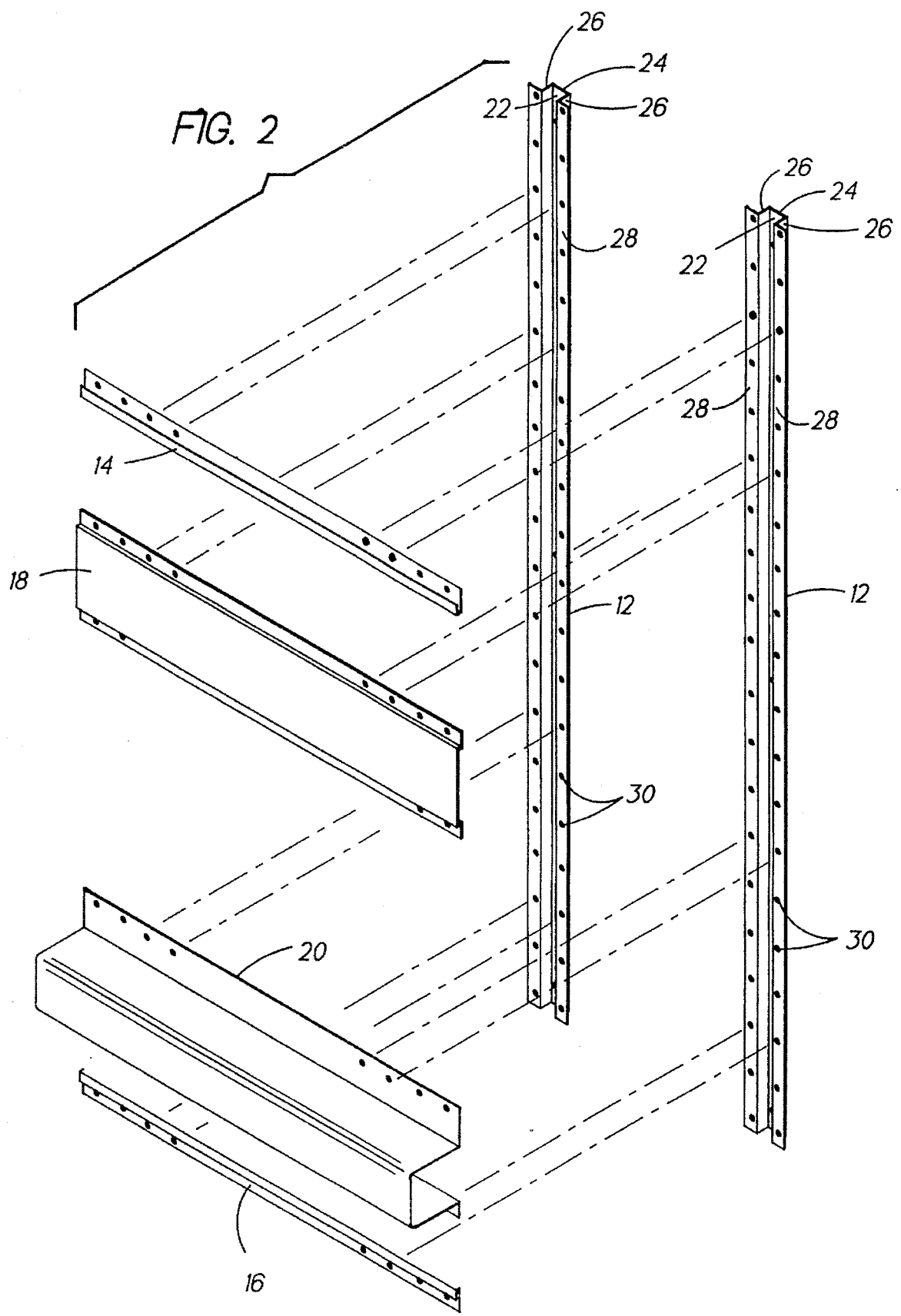
FIG. 2 is an exploded perspective view of the wall mount of FIG. 1.

Referring to FIGS. 1–3, the uprights 12 are elongated members preferably 50 to 60 inches long, comprising a channel 22, defined by a back wall 24 and side walls 26. Flanges 28 extend outwardly from each side wall 26. The side walls 26 are provided to add structural rigidity to the uprights 12 and to offset the flanges 28 from the back wall 24 a predetermined distance, preferably at least 1 inch, to facilitate assembly of the wall mount as will be discussed hereinafter. A series of holes 30 are spaced at equal intervals along the length of each of the flanges 28 and a series of transversely elongated slots 32 (FIG. 3) are spaced along the length of the back wall 24. In a preferred embodiment, the holes 30 are spaced 3 inches center to center, while a slot is preferably disposed at a predetermined distance from either end of the wall 24 with a third disposed equidistantly between the first two. The slots are the same width as the diameter of the holes 30, preferably at least 5/16 inch and are at least 0.75 inches long.

The J-channels 14 and 16 are generally elongated members which as shown in FIG. 4 are formed to have a generally "J" shaped profile, with a back plate 36, horizontal extension 38 and a front plate 40. As shown in FIG. 4, the distance between the back and front plates 36 and 40, denoted as dimension a, as well as the height of the front plate 40 from the horizontal extension 38, denoted as dimension b is between 0.5 and 0.75 inches and is preferably 5/8 inch to facilitate connection of a bicycle rack thereto as will be discussed more fully hereinafter. Referring to FIG. 3, the J-channels are of a predetermined length, preferably between 18 and 28 inches long and the back plate 36 has a series of holes 42 spaced along the length thereof. The holes 42 are preferably spaced from the extension 38 a distance greater than height b to facilitate assembly of the wall mount as will also be discussed hereinafter. In addition, a preferred embodiment includes a pair of innermost holes 42 spaced approximately 14 inches from one another, center to center, longitudinally centrally disposed on the back plate 36, with additional holes spaced every 2 inches outwardly therefrom to facilitate use of the wall mount with walls of various construction, to be discussed hereinafter.

As shown in the FIGS., the J-channels 14 and 16 are disposed generally perpendicularly to the two uprights 12 with conventional fasteners which extend through aligned holes 30 and 42 of the uprights and J-channels, respectively, as will be discussed more fully hereinafter. The upper and lower J-channels 14 and 16 are substantially identical with the exception that the upper J-channel 14 is disposed such that its "J" profile opens upwardly, while the lower J-channel is disposed such that its "J" profile opens downwardly.

Referring to FIGS. 3 & 4, the cross bar 18 is similar in construction to the uprights 12 and generally comprises an elongated channel 50, having a front wall 52 and side walls 54 and flanges 56 which extend outwardly from each side wall 54. Such channel construction is provided to lend structural rigidity to the cross bar 18. A series of holes 58 are spaced at equal intervals along the length of each of the flanges 56. In a preferred embodiment, a pair of innermost holes 58 spaced approximately 14 inches from one another, center to center, are centrally disposed on the flanges 56, with additional holes spaced every 2 inches outwardly therefrom in the same manner as set forth hereinabove with regard to the J-channels. The holes 58 are preferably 5/16 inch in diameter and the holes of opposite flanges 56 are preferably vertically offset from one another by a distance of approximately 6 inches center to center as denoted by dimension c in FIG. 3, while the height of the front wall 52 is approximately 5 inches as denoted by dimension d. The length of the cross bar 18 is preferably the same as each of the J-channels.

The bumper 20 is in many respects similar to the cross bar 18. The bumper generally comprises an elongated channel 60, having a front wall 62 and side walls 64. Upper and lower flanges 66 and 67, respectively, extend outwardly from each side wall 64, the upper flange 66 extending a predetermined distance from its side wall 64, preferably at least 1 inch, to form a supplementary engagement surface as will be discussed hereinafter. While the channel construction lends rigidity to the bumper, the side walls 64 also serve to provide an offset between the front wall 62 and the flanges 66 and 67 which is approximately 3 to 4 inches greater than the offset between the front wall and flanges of the cross bar 18 as denoted by dimension e in FIG. 4.

A series of holes 68 are spaced along the length of each of the flanges 66 and 67 in a manner similar to that of the cross bar 18. The holes 68 are preferably 5/16 inch in diameter and the holes of opposite flanges 66 and 67 are preferably vertically offset from one another by a distance of approximately 6 inches center to center as denoted by dimension f in FIG. 3, while the height of the front wall 62 is approximately 3.5 inches as denoted by dimension d. The length of the lower bumper 20 is preferably the same as the J-channels and upper cross bar, or between 18 and 28 inches.

The wall mount of the present invention is assembled and utilized by first fastening the uprights 12 to a wall. The hole spacing of the wall mount having 18 inch rungs is designed to accommodate 16 inch standard center to center stud spacing, plus or minus 2 inches. If 28 inch rungs are utilized, the wall mount can accommodate up to 24 inch standard stud spacing, plus or minus 2 inches. Accordingly, the uprights are oriented with their back walls 24 abutting the wall in generally vertical alignment with a wall stud and are then fastened to the wall by a screw type fastener passing through the slots 32 into the stud. Before completely tightening the fasteners, the rungs, including upper and lower J-channels 14 and 16, cross bar 18 and bumper 20 are disposed with their back plates or flanges in surface to surface engagement with the flanges 28 of the uprights 12 and then loosely fastened, preferably by conventional nut and bolt screw type fasteners, through aligned holes in the respective engaged surfaces. The choice of which holes are to be utilized depends upon the particular spacing of each member, however, at least one fastener should be utilized near each end of the J-channels and each end of each flange 56 and 66 of the cross-bar and bumper, respectively. This fastening operation is facilitated by the aforementioned offset between the back plate 26 and the flanges 28 of the uprights 12 which provide clearance between the wall and the flanges 28 to allow the user to manipulate the fasteners. The J-channels 14 and 16 are disposed at the upper and lower ends, respectively, of the uprights as shown in the FIGS. The upper cross bar 18 and lower bumper 20 are fastened to the uprights generally centrally disposed between the J-channels, at a distance from one another which is dictated by the vertical distance between the feet of the particular bicycle rack to be used with the wall mount. Once all the rungs have been loosely connected, the user can then thoroughly tighten all the fasteners to secure the wall mount members to one another and to the wall.

The wall mount is next fitted with a standard bicycle rack of the type designed to be strapped onto the rear portion of an automobile with lower supports or feet which either rest on or above the rear bumper, depending on the particular configuration of the rack. As shown in FIG. 1, such a typical rack 69 generally includes a frame 70 having upper and lower legs 72 and 74 each having resilient pads or feet 75 disposed thereon. The frame also includes generally horizontally extending bicycle supports 76. In the particular configuration shown, the feet 75 of lower legs 74 generally rest upon the face of the automobile bumper, while in the aforementioned other configuration, would rest above the bumper against the vehicle body. The feet 75 of the upper legs 72 rest against the rear hatch or trunk lid. Upper and lower adjustable straps 78 and 80 each have hooks 82 which serve to secure the rack to the vehicle. In particular, the upper straps 78 hook onto the upper lip of the hatch or trunk lid while the lower straps 80 hook onto the lower edge of the bumper or another suitable point on the underside of the automobile. When the straps are tightened, the feet 75 are compressed against the vehicle to prevent excessive movement of the rack. The wall mount of the present invention therefore mimics the rear portion of an automobile to permit the rack 69 to be mounted thereto in a manner similar to mounting on the auto. In particular, the feet 75 of the lower legs 74 are disposed on the bumper 20, as shown, or alternatively, against the upper flange 66. The upper legs 72 are disposed on the cross bar 18 and the straps are hooked onto J-channels 14 and 16, respectively, as shown. The preferred dimensions a and b of the J-channels as set forth hereinabove, permit the J-channels to receive the hooks of most commonly available bicycle racks 69.

Once the rack is so disposed, as a result of having the option of disposing the lower feet 75 against either the flange 66 of the bumper, or alternatively against the front wall 62 thereof which as discussed hereinabove is substantially horizontally offset from wall 52 of the cross bar, the bicycle supports 76 will be disposed in a generally horizontal orientation regardless of which of the aforementioned rack configurations are used. Accordingly, a bicycle can now be fitted onto the rack for storage on the wall. Once the wall mount is secured to the wall in the manner discussed above, it is a simple matter to transfer the rack back and forth as needed, between the wall mount and automobile by selectively loosening the straps.

The wall mount of the present invention provides the advantage of enabling a user to simply transfer a standard bicycle rack from the rear of one's automobile to the wall of one's garage, basement or apartment for indoor storage of both the rack and bicycle. This serves the dual function of providing efficient storage of the rack as well as of one or more bicycles without taking up valuable shelf and/or floor space. The wall mount could even be disposed on the front wall of a garage bay without reducing the parking area since the wall mount can be mounted high enough to support a bicycle well above the hood of a parked car.

The wall mount of the present invention, including the uprights and rungs, is preferably fabricated from a rigid light weight metal such as aluminum, and the preferred dimensions set forth hereinabove are directed to use of this material. However, the device may alternatively be fabricated from a high impact industrial polymer, composite or other suitable material, along with changes in dimension necessary to maintain the requisite structural integrity, while remaining within the spirit and scope of this invention.

It should be understood by one skilled in the art that the above-referenced dimensions, including hole size, spacing between holes, optimum length of the individual members and construction of the rungs, etc. simply represent a preferred embodiment and that changes could be made therein without departing from the spirit and scope of the present invention.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A wall mount for an automotive bicycle rack of the type having a plurality of upper and lower feet for engaging the rear portion of an automobile and straps with hooks disposed thereon for releasably securing the rack to the automobile, the wall mount comprising:

a plurality of rails for fastening to a generally vertical surface in generally coplanar orientation to one another;

an upper cross-beam member and a lower cross-beam member horizontally disposed onto said rails in vertically spaced relation for releasably receiving the hooks of the bicycle rack; and an upper cross bar and a lower bumper horizontally disposed onto said rails in vertically spaced relation between said upper cross-beam member and said lower cross-beam member, each of said upper cross bar and lower bumper having a generally vertical front engagement surface for engaging the feet of the rack, said front engagement surface of said lower bumper extending further from said rails than said front engagement surface of said upper cross bar for supporting the lower feet of the rack further from said rails than the upper feet of the rack by a predetermined distance.

2. The wall mount of claim 1, wherein said front engagement surface of said upper cross bar and lower bumper are generally flat.

3. The wall mount of claim 1, wherein said lower bumper further comprises a second generally flat, vertical front engagement surface for engaging the feet of the rack, said second front engagement surface disposed in generally the same vertical plane as said front engagement surface of said upper cross bar.

4. The wall mount of claim 1, wherein said cross-beam members has a profile generally resembling a "J", said upper cross-beam member opening in the generally upward direction, and said lower cross-beam member opening in a generally downward direction.

5. The wall mount of claim 1, wherein said predetermined distance is approximately 3 to 4 inches.

6. The wall mount of claim 1, wherein said upper cross-beam member and said lower cross-beam member are adjustably secured to said rails for selectively varying the distance between said upper cross-beam member and said lower cross-beam member.

7. The wall mount of claim 1, wherein said upper cross bar and said lower bumper are adjustably secured to said rails for selectively varying the distance between said upper cross bar and said lower bumper.

8. The wall mount of claim 1, wherein said rails are adjustably secured to said upper cross-beam member, said lower cross-beam member, said upper cross bar and said lower bumper for selectively varying the distance between said rails.

9. The wall mount of claim 1, wherein said front engagement surface of said upper cross bar has a width of approximately 5 inches.

10. The wall mount of claim 1, wherein said front engagement surface of said lower bumper has a width of approximately 3.5 inches.

* * * * *